United States Patent [19]
Nelson et al.

[11] Patent Number: 6,054,512
[45] Date of Patent: Apr. 25, 2000

[54] CORROSION INHIBITING THERMOPLASTIC ALLOYS

[75] Inventors: Thomas Nelson, Burnsville, Minn.;
Scott Bradley, Denmark, Wis.;
Margarita Kharshan, Little Canada;
Boris Miksic, North Oaks, both of Minn.

[73] Assignee: Cortec Corporation, St. Paul, Minn.

[21] Appl. No.: 09/229,055

[22] Filed: Jan. 12, 1999

[51] Int. Cl.⁷ ...................................................... C08K 5/34
[52] U.S. Cl. ........................... 524/91; 524/260; 524/394; 524/406; 524/429
[58] Field of Search .................................. 524/260, 429, 524/91, 394, 406

[56] References Cited

U.S. PATENT DOCUMENTS

| | | | |
|---|---|---|---|
| 3,592,794 | 7/1971 | Drake et al. | 524/429 |
| 3,642,998 | 2/1972 | Jennings | 21/2.5 |
| 4,333,850 | 6/1982 | Krueger | 252/389 |
| 5,380,783 | 1/1995 | Satake et al. | 524/406 |
| 5,840,381 | 11/1998 | Ohtsuka | 428/34.4 |

FOREIGN PATENT DOCUMENTS

| | | |
|---|---|---|
| 57-55981 | 4/1982 | Japan . |
| 4-337334 | 11/1992 | Japan . |

*Primary Examiner*—Veronica P. Hoke
*Attorney, Agent, or Firm*—Haugen Law Firm PLLP

[57] ABSTRACT

Corrosion inhibiting thermoplastic alloys and methods of preparing same for use in fabricating molded articles with long-term corrosion protection. Masterbatches of an ABS resin together with selected corrosion inhibitor formulations are extruded for use in molding operations particularly adapted for preparing protective enclosures for delicate metals, such as are present in electronic media devices and apparatus. Molded articles are prepared from acrylonitrile butadiene styrene resin and a solid phase corrosion inhibitor blended in situ, and wherein the resin consists essentially of acrylonitrile butadiene styrene, and wherein the corrosion inhibitor contains a blend of dicyclohexylammonium nitrite, sodium nitrite, benzotriazole, sodium molybdate and sodium sebacate.

3 Claims, No Drawings

CORROSION INHIBITING THERMOPLASTIC ALLOYS

BACKGROUND OF THE INVENTION

Novel corrosion inhibiting thermoplastic alloys can be prepared by blending corrosion inhibitors with selected plastics suitable for injection molding. In accordance with the present invention, thermoplastic alloys suited to form improved molded housings useful for protective enclosures for electronic media devices against corrosion. Certain thermoplastic substances are blended with selected corrosion inhibitors to create working formulations of these alloys which are adaptable for molding operations. The selected corrosion inhibitors are retained in-situ during the molding operation or cycle and yet will subsequently slowly vaporize and/or sublime into the device enveloping enclosures to provide protection for long term use and storage.

Flexible films incorporating vapor corrosion inhibitor chemicals have been available and are used widely for the protection of metallic articles in storage and shipping. Such applications are especially useful for sensitive electronic media devices and other delicate metallic articles. Paper has been coated with vapor corrosion inhibitors and used for protection of metallic articles during storage and shipping. Vapor corrosion chemicals are also available in small pellets and packages, and may be impregnated into plastic foam to provide other methods of protection. Vapor corrosion inhibitors may also be coated on paper and otherwise included in low melting flexible films such as polyethylene. All of the above methods are typically temporary in nature with the exception of appropriately packaged chemicals that can provide up to two years protection in enclosed or confined areas.

The most effective inhibitors volatilize easily and this volatility feature has been found to preclude their use in the higher melting thermoplastic systems which may be needed for some rigid enclosures. Acrylonitrile butadiene styrene (ABS) resins however are thermoplastic materials that provide an excellent balance of physical properties including impact and heat resistance and are suitable for many applications. In addition, ABS can be processed at a low enough temperature to enable the addition of a sufficient quantity of certain selected corrosion inhibitor chemicals to function effectively in protecting the metals intended to be enclosed in molded parts. The improved corrosion inhibiting formulations, in combination with the preselected ABS resins, provide a unique feature inasmuch as the corrosion inhibitors become semi-permanently encapsulated within the resin matrix, and thereafter leach out at a rate which provides ongoing protection over an extended period of time.

SUMMARY OF THE INVENTION

In accordance with the present invention, it has been determined that acrylonitrile butadiene styrene (ABS) resin can be blended with selected higher melting corrosion inhibiting chemicals in a masterbatch formulation containing about 85 parts ABS and 15 parts inhibitors. This masterbatch can be blended further with ABS to produce a working formulation or mix containing about 1–7.5% inhibitors and with this formulation being suitable for injection molding.

Typical articles prepared with from 2 to 7.5% inhibitor in an ABS mix are knife holders, tackle boxes, toolboxes, electronic enclosures and any other injection molded pieces utilized in enclosing and protecting metallic articles against corrosion from corrosive elements in the atmosphere and/or ambient.

Therefore, it is a primary object of the present invention to provide an improved molding compound capable of receiving, retaining, and ultimately releasing a vapor phase corrosion inhibitor from within the body or structure of a molded article forming a protective enclosure. Because of the requirements of thermoplastic alloys of the present invention, acrylonitrile butadiene styrene (ABS) resin has been found to be most uniquely and advantageously utilized inasmuch as it is readily filled with a quantity of granular, pulverulent or powder form corrosion inhibitor, with the melting point of the base resin being such that the corrosion inhibitor remains in-situ and does not become fugitive during exposure to conditions required the molding operation. Such a combination of properties is important inasmuch as exposure to relatively high temperatures for a finite period of time may be adequate to cause certain corrosion inhibiting compounds, when combined with other resins, to flash, sublime or otherwise become lost during the molding process. By use of carefully selected corrosion inhibitors, in combination with appropriate blending and masterbatch techniques, a suitable molding material may be made from ABS resin and the selected corrosion inhibiting compounds.

The use of a technique employing a masterbatch step has been found to preserve the quality and character of the corrosion inhibitor in the resin matrix for a period of time suitable for achieving an appropriate shelf life, during which the pre-blended masterbatch is extended with additional quantities of ABS in preparation of the working formulation or blend.

Other and further objects of the present invention will become apparent to those skilled in the art upon a study of the following specification and appended claims.

DESCRIPTION OF THE PREFERRED EMBODIMENT

Masterbatches embodying features of the present invention are prepared using ABS Dow 9020, an ABS plastic found suited for molding applications in accordance with the present invention. This masterbatch is later blended with a selected corrosion inhibitor at a ratio of 85 parts ABS and 15 parts inhibitor. Select inhibitors suitable for this process are higher melting types such as sodium nitrite, dicyclohexylammonium nitrite, sodium molybdate and benzotriazole. Formulations of inhibitors that have been found suited for blending with ABS resins and which are particularly effective contain the following components:

| FORMULA 1 | |
|---|---|
| Dicyclohexylammonium Nitrite | 6% |
| Sodium nitrite | 25% |
| Sodium molybdate | 65% |
| Benzotriazole | 4%. |

Another formulation found to be especially compatible with ABS contains more of an organic component, as follows:

| FORMULA 2 | |
|---|---|
| Benzotriazole | 6% |
| Sodium sebacate | 60% |
| Sodium nitrite | 4% |

-continued

FORMULA 2

| Dicyclohexylammonium Nitrite | 6% |
|---|---|
| Sodium molybdate | 24%. |

FORMULA 3

| Dicyclohexylammonium Nitrite | 8% |
|---|---|
| Sodium nitrite | 27% |
| Sodium molybdate | 65%. |

In the event the metallic articles to be protected do not include copper, Formula 3 set forth above is an effective inhibitor combination.

GENERAL COMMENTS

Those ABS resins produced by Dow Chemical such as those sold under the trade designations "ABS Dow 9555", "ABS Dow 213", "ABS Dow 9020" have been found to function effectively when used as the carrier resin in the masterbatch and also function well as the further extender for the masterbatch when mixed to produce the working blend needed for injection molding operation. The masterbatch preferably contains from between about 5 to 20 parts of a selected corrosion inhibitor blend or mix as set forth herein.

Typical specific examples describing the invention are as follows:

EXAMPLE 1

ABS Dow 9020, 85 parts, and 15 parts of an inhibitor mix (Formula 1) was fed into a vented twin screw extruder. Temperatures ranged from 150° C. to 220° C. and the extrudate was water or air cooled and pelletized. The pellets were further blended at a ratio of 12 parts pellets to 88 parts ABS to produce a blend suitable for injection molding. Injection molding produced rigid pieces that tested satisfactorily as a carrier of in-situ retained corrosion resistant chemicals (contact inhibitor) and also as a long-term vapor phase corrosion inhibitor source. The physical properties of the molded articles were such that subsequent release of the inhibitor into the ambient through sublimation and/or contact phenomena was appropriately achieved.

EXAMPLE 2

ABS Dow 9555 (85 parts) and 15 parts of an inhibitor mix (Formula 3) was fed into a vented twin screw extruder. The temperature ranged from 115° C. at the first zone to 220° C. at the die. The strands were water quenched and pelletized. These masterbatch pellets were further blended with ABS Dow 9555 at a ratio of 12 parts to 88 parts ABS 9555 to produce a working blend suitable for injection molding. Molded articles prepared with Formula 2 were especially useful for an embedded steel application such as for use as a knife handle. A gun case prepared from the mix can be used for long term storage, and in an alternative application, a storage container prepared from the mix may be found useful for storing steel measuring tools such as a micrometer.

Volatility of the corrosion inhibitor in the working formulation or mix is especially important when the material is subjected to the final injection or forming stage of preparing rigid forms. If the pieces have a thick cross-section or require higher molding temperatures, degassing of the inhibitor could ensue and adversely affect the properties of the molded piece. Selection of the lowest melting ABS suitable for the desired end product is essential for blending with the most volatile inhibitors. The inhibitor formulations described in Formulas 1 and 2 are well suited for a wide range of ABS resins and can be used without undergoing degassing or significant loss during molding.

Inhibitors that are somewhat more volatile are those containing somewhat larger proportions of cyclohexylammonium benzoate, ammonium benzoate and other salts of amines. Components of Formula 1 or 2 can be used if the article being molded is of a configuration such that molding can be achieved without degassing. Formulas 1 and 2 were both effective in corrosion control when tested in standard tests. In each case, controls of the same ABS resin without inhibitors were prepared and compared to the resins that included Formula 1 and Formula 2 inhibitors.

Acrylonitrile butadiene styrene parts prepared with Formulas 1 and 2 protected both steel and copper parts when exposed to a corrosive environment while the control without inhibitors did not protect either the steel or copper.

An ABS part prepared with Formula 3 protected steel when exposed to a corrosive environment while the control without inhibitors did not.

It will be appreciated that the specific examples provided herein are for purposes of illustration only and are not to be otherwise construed as a limitation upon which the invention would otherwise be entitled.

What is claimed is:

1. A masterbatch suitable for extending and preparing a molding compound comprising about 100 parts of a terpolymer resin of acrylonitrile butadiene styrene, and between about 5 to 20 parts of a corrosion inhibitor, and wherein:

(a) the corrosion inhibitor contains a blend of corrosion inhibitors consisting of a permutation of two or more members selected from the group consisting of dicyclohexylammonium nitrite, sodium nitrite, benzotriazole, sodium molybdate and sodium sebacate.

2. An acrylonitrile butadiene styrene resin blended with a corrosion inhibitor chemical, and containing at least about 95% terpolymer resin, balance corrosion inhibitor, and wherein the blend is characterized in that the corrosion inhibitor is a permutation of two or more corrosion inhibitors selected from the group consisting of dicyclohexylammonium nitrite, sodium nitrite, benzotriazole, sodium molybdate and sodium sebacate.

3. Molded articles fabricated from a blend of acrylonitrile butadiene styrene terpolymer resin and a solid phase corrosion inhibitor wherein the resin consists essentially of acrylonitrile butadiene styrene terpolymer resin, and wherein the corrosion inhibitor consists of a blend of a permutation of two or more members selected from the group consisting of dicyclohexylammonium nitrite, sodium nitrite, benzotriazole, sodium molybdate and sodium sebacate, and present in the blend in an amount of from about 1% to about 5% of corrosion inhibitor, balance terpolymer resin.

* * * * *